(12) United States Patent
Niu et al.

(10) Patent No.: US 11,116,096 B2
(45) Date of Patent: Sep. 7, 2021

(54) MEDIUM FOR BINDING COMPONENTS IN AN ASSEMBLY OF AN ELECTRONIC DEVICE, A METHOD OF PREPARING THE SAME, A DISPLAY ASSEMBLY OF AN ELECTRONIC DEVICE, AND A SYSTEM FOR SIMULATING MECHANICAL BEHAVIOURS OF THE ELECTRONIC DEVICE AND THE MEDIUM

(71) Applicant: City University of Hong Kong, Kowloon (HK)

(72) Inventors: Xinrui Niu, Kowloon (HK); Bo Xu, Kowloon (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 16/387,759

(22) Filed: Apr. 18, 2019

(65) Prior Publication Data

US 2020/0337167 A1    Oct. 22, 2020

(51) Int. Cl.
*H05K 5/03* (2006.01)
*H04M 1/02* (2006.01)
*H05K 5/00* (2006.01)
*G06F 30/20* (2020.01)

(52) U.S. Cl.
CPC ............. *H05K 5/03* (2013.01); *G06F 30/20* (2020.01); *H04M 1/0266* (2013.01); *H05K 5/0017* (2013.01); *C09K 2323/05* (2020.08)

(58) Field of Classification Search
CPC ...... H05K 5/03; H05K 5/0017; H05K 5/0021; H04M 1/0266; Y10T 428/14; G02F 2202/28; G02F 2323/05

USPC ........... 428/1.5, 41.9, 40.1, 214, 218, 355 R; 359/245
See application file for complete search history.

(56) References Cited

U.S. PATENT DOCUMENTS

2010/0110567 A1    5/2010  Glacet et al.
2012/0274887 A1*  11/2012  Hwang ............... G02F 1/13718
                                           349/115

FOREIGN PATENT DOCUMENTS

CN    102582106    7/2012
WO    2018112247   6/2018

* cited by examiner

*Primary Examiner* — Ruiyun Zhang
(74) *Attorney, Agent, or Firm* — Renner, Kenner, Greive, Bobak, Taylor & Weber

(57) ABSTRACT

A medium for binding components in an assembly of an electronic device, a method of preparing the same, a display assembly of an electronic device, and a system for simulating mechanical behaviours of the electronic device and the medium. The medium including: a first layer of material defining a first portion arranged to connect with a first electronic component of the assembly; and a second layer of material defining a second portion having a set of mechanical properties with one or more values different from those in the first portion, and the second layer of material is arranged to connect with a second electronic component of the assembly; wherein the combination of the first layer of material and the second layer of material is arranged to minimize stress established in the first electronic component when the first electronic component combines with the second electronic component.

17 Claims, 14 Drawing Sheets
(1 of 14 Drawing Sheet(s) Filed in Color)

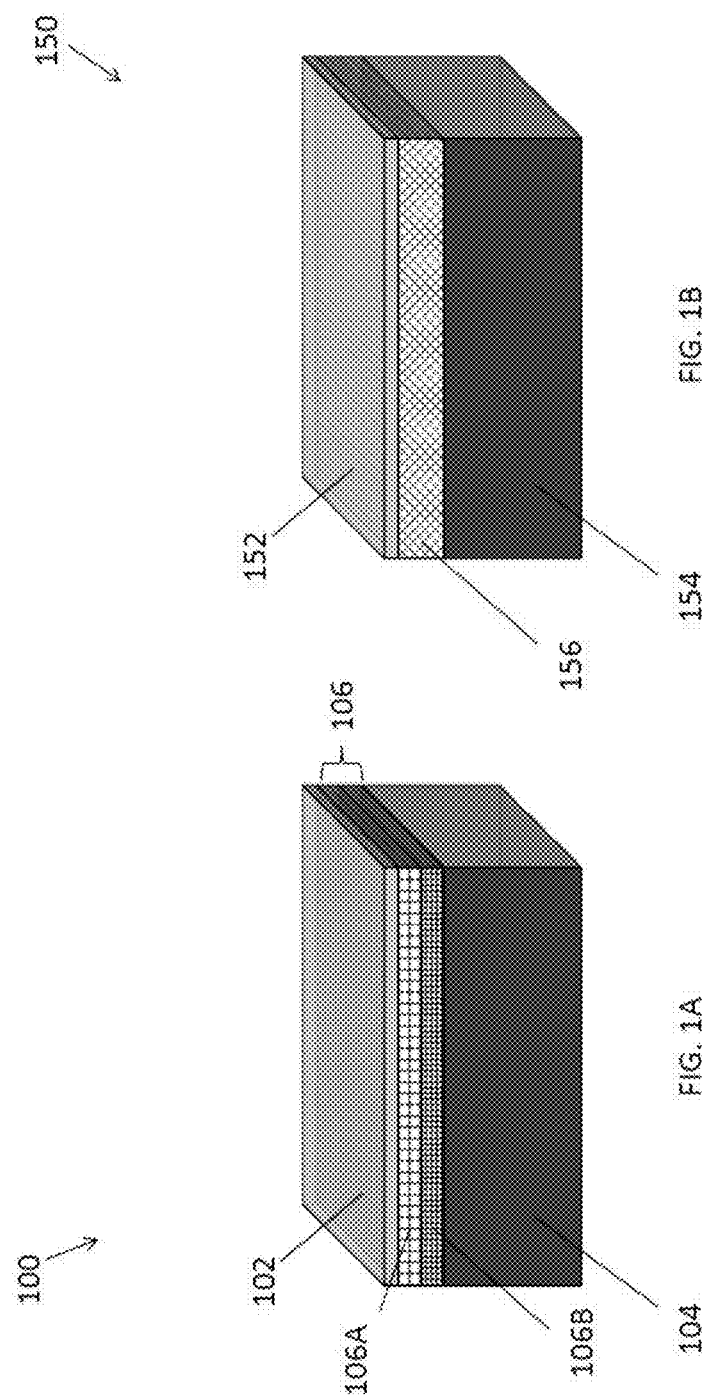

MEDIUM FOR BINDING COMPONENTS IN AN ASSEMBLY OF AN ELECTRONIC DEVICE, A METHOD OF PREPARING THE SAME, A DISPLAY ASSEMBLY OF AN ELECTRONIC DEVICE, AND A SYSTEM FOR SIMULATING MECHANICAL BEHAVIOURS OF THE ELECTRONIC DEVICE AND THE MEDIUM

TECHNICAL FIELD

The present invention relates to a medium for binding components in an assembly of an electronic device, and particularly, although not exclusively, to an adhesive medium for binding different layers in a display assembly.

BACKGROUND

An electronic device, such as a mobile phone or a tablet computer, may include a screen that may display information to a user. To protect the display elements such as the liquid crystal layers or the LEDs, a cover glass may be used to cover these elements underneath to prolong the lifetime of the screen and hence the device.

In some example devices, display screens may further provide a touch-input function that enable the screen to receive user-input by touching or pressing directly onto the surface of the screen, which may be implemented by sandwiching an extra touch panel between the display panel and the topmost cover glass.

SUMMARY OF THE INVENTION

In accordance with a first aspect of the present invention, there is provided a medium for binding components in an assembly of an electronic device, comprising: a first layer of material defining a first portion arranged to connect with a first component of the assembly; and a second layer of material defining a second portion having a set of mechanical properties with one or more values different from those in the first portion, and second layer of material is arranged to connect with a second component of the assembly; wherein the combination of the first layer of material and the second layer of material is arranged to minimize stress established in the first component when the first component combines with the second component.

In an embodiment of the first aspect, the medium is arranged to act as a stress-dispersing layer between the first component and the second component.

In an embodiment of the first aspect, the medium is arranged to act as a bonding layer between the first component and the second component.

In an embodiment of the first aspect, the medium is arranged to inhibit and deviate the growth of cracks in the first component.

In an embodiment of the first aspect, the types of mechanical properties include at least one of Young's modules, hardness, mechanical strength, ductility and toughness, and other types of mechanical properties.

In an embodiment of the first aspect, the quantity of an individual mechanical property, such as Young's modulus, hardness, mechanical strength, ductility, toughness or other types of mechanical properties, is different in the first layer of material and the second layer of material.

In an embodiment of the first aspect, the quantity of an individual mechanical property gradually changes across the thickness of the first layer of material to the second layer of material.

In an embodiment of the first aspect, the quantity of an individual mechanical property is in between of that of the first component and that of the second layer of material.

In an embodiment of the first aspect, the medium includes a polymer composite.

In an embodiment of the first aspect, the polymeric composite includes a liquid optical clear adhesive material.

In an embodiment of the first aspect, the polymer composite further includes ceramic fillers.

In an embodiment of the first aspect, the ceramic fillers include an inorganic compound.

In an embodiment of the first aspect, the inorganic compound includes (but not limited to) silica or zirconia.

In an embodiment of the first aspect, the medium includes 0.1-10% of volume percentage of ceramic fillers.

In an embodiment of the first aspect, the first layer of material and the second layer of material are optically transparent.

In an embodiment of the first aspect, the first layer of material and the second layer of material have the same thickness.

In an embodiment of the first aspect, the thickness of the combination of the first and the second layers of material is 0.2 mm.

In an embodiment of the first aspect, the assembly is a display assembly.

In an embodiment of the first aspect, the electronic device includes a computing device and/or a display device.

In an embodiment of the first aspect, the first component and the second component include at least two of a transparent cover, a touch panel and a display panel.

In an embodiment of the first aspect, the first component includes a piece glass.

In accordance with a second aspect of the present invention, there is provided a display assembly of an electronic device, comprising a first component and a second component, and a medium for binding components in an assembly in accordance with the first aspect.

In accordance with a third aspect of the present invention, there is provided a method for manufacturing an assembly in an electronic device, comprising the steps of: applying a second layer of material on a second component of the assembly; applying a first layer of material on the second layer of material; and disposing a first component on the first layer of the material; wherein the combination of the first layer of material and the second layer of material forms a binder medium to connect the first component to the second component, and to minimize stress established in the first component when the first component combines with the second component; wherein the first layer of material defines a first portion of the binder medium; and wherein the second layer of material defines a second portion of the binder medium having a set of mechanical properties with one or more values different from those in the first portion.

In an embodiment of the third aspect, the method further comprises the step of mixing a polymer matrix material with ceramic fillers to form the first layer of material and/or the second layer of material.

In an embodiment of the third aspect, the ceramic fillers and the polymer matrix material are mixed manually or by a vacuum mixer.

In an embodiment of the third aspect, the method further comprises the step of degassing the mixture for a predetermined period of time prior to applying the first or the second layer of material.

In an embodiment of the third aspect, the method further comprises the step of curing the first and/or the second layer of material.

In an embodiment of the third aspect, the first and/or the second layer of material is cured by UV light or heating oven.

In one exemplary embodiment of the present invention, there is provided a tri-layer beam structures to evaluate the mechanical behaviour of smartphones under the three-point bending load. Advantageously, a graded adhesive layer may increase the damage resistance ability of glass in the tri-layer beam structures.

In an embodiment of the fourth aspect, there is provided a system for simulating mechanical behaviours of an electronic device including a display assembly in accordance with the second aspect, comprising:
- a component generation module arranged to create a plurality of models of the electronic device and a plurality of rigid bodies; and
- a simulation module arranged to simulate mechanical behaviours of the electronic device associated with the plurality of models being generated;
wherein the plurality of rigid bodies defines a plurality of rigid support structures that apply external mechanical loads to the electronic device at different positions.

The models may be generated as a finite element (FE) model which can replicate the behaviour of a smartphone under three-point bending load.

In an embodiment of the fourth aspect, the electronic device is relatively flexible when compared to the plurality of rigid bodies.

In an embodiment of the fourth aspect, the simulation module is arranged to simulate the mechanical behaviours of the electronic device under a three-point bending test.

In an embodiment of the fourth aspect, the plurality of rigid bodies includes:
- a first rigid body and a second rigid body representing two supporting rollers arranged to support the electronic device in the three-point bending test; and
- a third rigid body to arranged to apply a loading punch to the electronic device in the three-point bending test;

In an embodiment of the fourth aspect, the model of the electronic device is represented by a deformable part in the three-point bending test.

In an embodiment of the fourth aspect, the electronic device comprises a glass layer, an adhesive layer and a device body layer.

In an embodiment of the fourth aspect, the adhesive layer further comprises a plurality of sub-layers each includes individual mechanical properties.

In an embodiment of the fourth aspect, the glass layer and the adhesive layer further comprises respectively a plurality of 20-node quadratic brick elements with reduced integration and a plurality of 8-node linear brick elements with reduced integration.

In an embodiment of the fourth aspect, the size of brick elements increases gradually from the centre of the electronic device where stresses are concentrated to the two ends of the electronic device along the longitudinal direction of the electronic device.

In an embodiment of the fourth aspect, the device body layer further comprises a plurality of 8-node linear brick elements with reduced integration.

The FE model may comprises 4 parts: 3 rigid bodies to simulate two rollers and one punch in three-point bending test, and 1 deformable body to simulate the smartphone. In addition, the deformable body may consists of 3 layers: the top layer to simulate the cover glass in a smartphone, the middle layer to simulate the adhesive layer in a smartphone and the bottom layer to simulate the rest electronic components of a smartphone. The middle layer may be further divided into two mini layers, the mechanical properties such as Young's modulus of the first mini layer and the second mini layer can be different.

In an embodiment of the fifth aspect, there is provided a system for simulating mechanical behaviours of a medium in accordance with the first aspect, comprising an optimization module arrange to simulate mechanical behaviours of the medium based on different parameters in the first layer of material and the second layer of material.

In an embodiment of the fifth aspect, the parameters includes at least one geometric property and at least one mechanical property.

In an embodiment of the fifth aspect, the optimization module is arranged to determine stresses, strains and deformation of an electronic device under external mechanical loads.

In an embodiment of the fifth aspect, the optimization module is arranged to output or export the stresses, strains and deformation of the electronic device under external mechanical loads.

The system may be used to optimize the design of the adhesive layer in a smartphone, based on an evaluation of the effect of mechanical properties of adhesive layers on the strength of smartphones under different loading conditions.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the present invention will now be described, by way of example, with reference to the accompanying drawings in which:

FIGS. 1A and 1B are schematic views of a medium for binding components in an assembly of an electronic device in accordance with two embodiments of the present invention;

DETAILED DESCRIPTION OF THE PREFERRED EMBODIMENT

Figure 2A:
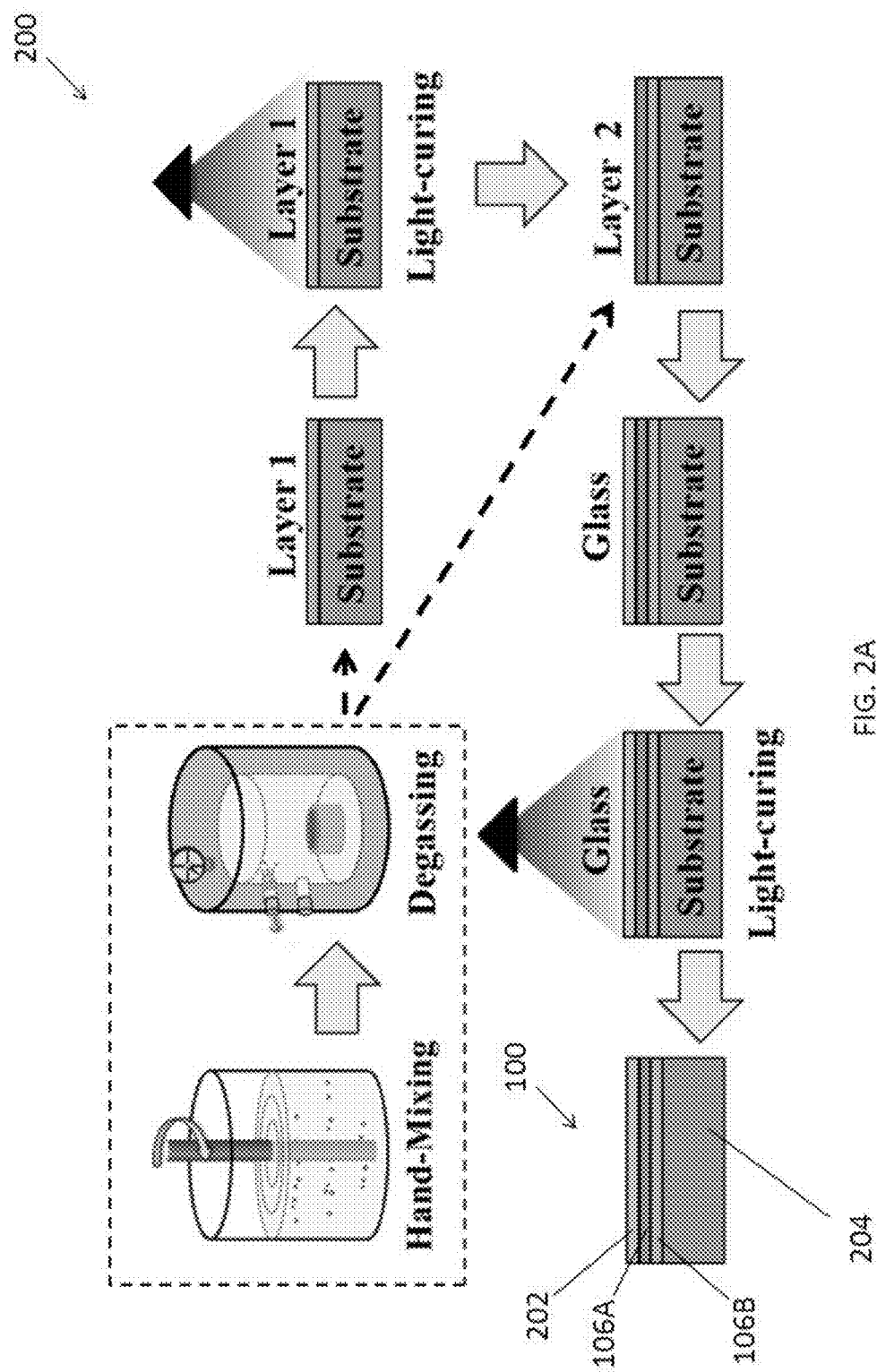
FIG. 2A is a flow diagram showing an example process flow of fabricating an assembly including the binder medium of FIG. 1A.

The inventors have devised that electronic devices such as smartphones and tablet computers may be frequently used in daily life. With the advancement of manufacturing technologies, screen size of smartphones may become larger and larger due to user's demands. On the other hand, larger screen panels may facilitate dissipation the heat generated by electronic components tightly packed within the internal cavity in the mobile devices.

Smartphone screens may have a size ranging between 2.5 and 4 inches (measured by the diagonal length). Alternatively some smartphones may include a larger form factor and therefore may be equipped with screens of larger dimensions, ranging from 6.2-6.5 inches for some example phone devices. In some example devices such as mobile computing devices or "tablet computers", the size of the display screen may be in a range of 7-15 inches.

With an increase in smartphone screen size, the screens may be easier to be cracked or shattered than smaller screens, which causes smartphone need to be repaired due to broken screens, including damages in the touch screen/cover glass or the internal LCD display panel.

In some example manufacturing process for the production of the display panel assembly in these electronic devices, liquid optical clear adhesive (LOCA) may be used in, due to its optical and mechanical properties suitable for these display applications. For example, a layer of LOCA may be used for binding the cover glass and touch panel in smartphones, portable computing devices or display/monitor devices.

The inventors devise that, due to mismatch in the mechanical properties of the different layers, stress may concentrates at the center of the subsurface of the top glass, leading to the cracks initiation and propagation in the cover glass.

With reference to FIG. 1A, there is shown an example embodiment of an assembly 100, such as a display assembly of an electronic device. The assembly 100 comprises a first component 102 and a second component 104, and a medium 106 for binding the first component 102 and the second component 104, and thereby defining a multilayer structure.

In this embodiment, the binder medium 106 sandwiched between the first component 102 and the second component 104 may be a layer of adhesive that connects the opposite surfaces of the two components 102, 104, so as to connect the two components together.

Preferably, the binder medium 106 comprises a multilayer structure, including a first layer of material 106A defining a first portion of the medium 106 having a first mechanical property, and a second layer of material 106B defining a second portion having a second mechanical property.

Preferably, the mechanical property of the first layer of material 106A is different from that of the second layer of material 106B. The mechanical property of the first layer of material 106A is in between of the mechanical property of the first component 102 and the mechanical property of the second layer of material 106B, thereby minimizing the effect of the mismatch of the mechanical properties between the first component 102 that connects to the first portion of the binder medium 106 and the second component 104 that connects to the second portion of the binder medium 106.

Without wishing to be bound by theory, different layers of the multiplayer structure may include different mechanical properties. For example, the Young's modulus of an example cover glass may be around 65.8 GPa, while that of the phone body layer may be around 1.68 GPa. In addition, the Young's modulus of some example LOCA layers may be around 1 MPa.

Preferably, the medium 106 that includes the combination of the first layer of material 106A and the second layer of material 106B, may operate as a stress-dispersing layer between the first component 102 and the second component 104, thereby minimizing stress established in the first component when the first component 102 combines with the second component 104. In addition, the multilayer binder medium 106 may also inhibit and deviate the growth of cracks in the first component 102, such as a glass cover in the display assembly 100.

In an exemplary electronic device, multiple components such as a transparent cover, a touch panel and a display panel combined to form a unitary assembly that may be further mounted to the casing of the device and to encapsulate the internal electronics within the internal cavity in the electronic device. Additionally or optionally, a piece of glass, such as a piece of "protective glass cover" may be used to cover the topmost component to further protect the layers underneath.

With reference also to FIG. 1B, there is shown an alternative example of an assembly 150 comprising two components bonded by a binder medium 156. In this example, binder medium 156 includes a single layer of material that connects to the top layer 152 and bottom layer 154. For example, the binder medium 156 may be a single layer of LOCA which is optically transparent and has an optical property that matches with the cover glass 152, and therefore may be suitable for the application of display panel assembly.

As discussed above, there may be a large mismatch between the Young's modulus of the first and the second components, and the mismatch may induce mechanical stress in both components when the two components are physically connected together. It may be more preferable that a binder medium that includes a gradual change in the mechanical properties across its thickness may be used to bind the two components. Preferably, the binder medium 106, such as the bi-layer adhesive referring to FIG. 1A, is also optically transparent in both the first and the second layer of material, such that it is also suitable for the use in similar applications.

For example, in the graded adhesive, the second layer of material 106B may be a liquid optical clear adhesive layer, which may be a polymer composite that is used to physically bind two components and is optically transparent. The first layer of material 106A may also be an LOCA layer, however it further includes a different composition. The first LOCA layer 106A may be made by introducing a predetermined amount of ceramic fillers, such as 2 vol % of ceramic particles into the LOCA layer.

Preferably, the ceramic fillers include at least one inorganic compound such as silica and/or zirconia, and the medium may include 0.1-10% volume percentage of ceramic fillers in each of the layers. By introducing a small amount of ceramic fillers into the polymeric LOCA layer, the mechanical properties of the first LOCA layer is modified to be different from that of the second LOCA layer. The mechanical properties may include one or more of Young's modules, hardness, mechanical strength, thickness and density.

With reference to FIG. 2A, there is shown an example fabrication process 200 for manufacturing an assembly 100 in an electronic device. The "substrate" layer 204 may be considered as the "base" layer that is to be combined with an additional component 202 on top using the multi-layered adhesive 106 in accordance with the embodiments of the present invention. For example, a display panel may be a substrate in a manufacturing process that combines with the touch panel or covering glass on top using the binder medium 106 or the adhesive. Alternatively, a complete smartphone device may be considered as a substrate that is combined with a protective glass on top using the adhesive 106.

Preferably, the fabrication process may start with mixing a precursor of an LOCA material or a polymer matrix material with or without ceramic fillers, and applying the second LOCA layer 106B onto the substrate. Optionally or additionally, to remove air or any other gases introduced to the mixture during mixing, the mixture may be degassed for a predetermined period of time, preferably less than or equal to 96 hours in a low pressure or vacuum environment, prior to applying to the substrate surface. The precursor may be prepared by using a vacuum mixer or may be manually mixed or agitated.

The precursor or the matrix may be applied onto the surface of the substrate 204 using spin coating or blade coating, or any suitable method, such that the thickness of the applied mixture is conformal across the surface of the substrate 204. Then the second layer of material 106B may be cured, for example by using UV light for UV-curable polymer matrix. Alternatively, other curing method (such as heat-curing or self-curing) may be used for different types of LOCA applied to the substrate.

After curing the second layer of material 106B, a first layer of material 106A of the binder medium 106 may be applied onto the cured second LOCA layer 106B, by repeating the similar process for depositing the second layer of material 106B onto the substrate 204, including the mixing of polymer matrix with ceramic fillers, degassing the mixture, and coating the precursor onto the substrates.

To complete the assembling of the first component to the second component, the top most component 202 such as a piece of glass is placed on top of the first LOCA layer 106A, followed by light curing of UV exposures. Alternatively, UV curing may be performed after the deposition of the first and the second LOCA layers covered with the covering glass 204.

Preferably, the contents of the ceramic fillers in the polymer matrix in each of the layers are different such that the different layers in the binder medium has different mechanical properties, resulting a gradual change in the mechanical properties such as Young's modulus across the thickness of the medium. Additional layers of LOCA material with different contents of ceramic fillers in the matrix may be further included between the first and the second layers in some alternative embodiments, which may further reduce the mismatch of physical/mechanical properties between layers in each adjacent layers in the multi-layered structure.

For example, the binder medium may have a total thickness of 0.2 mm and each of the first and the second layer has the same thickness of 0.1 mm.

Figure 2B:
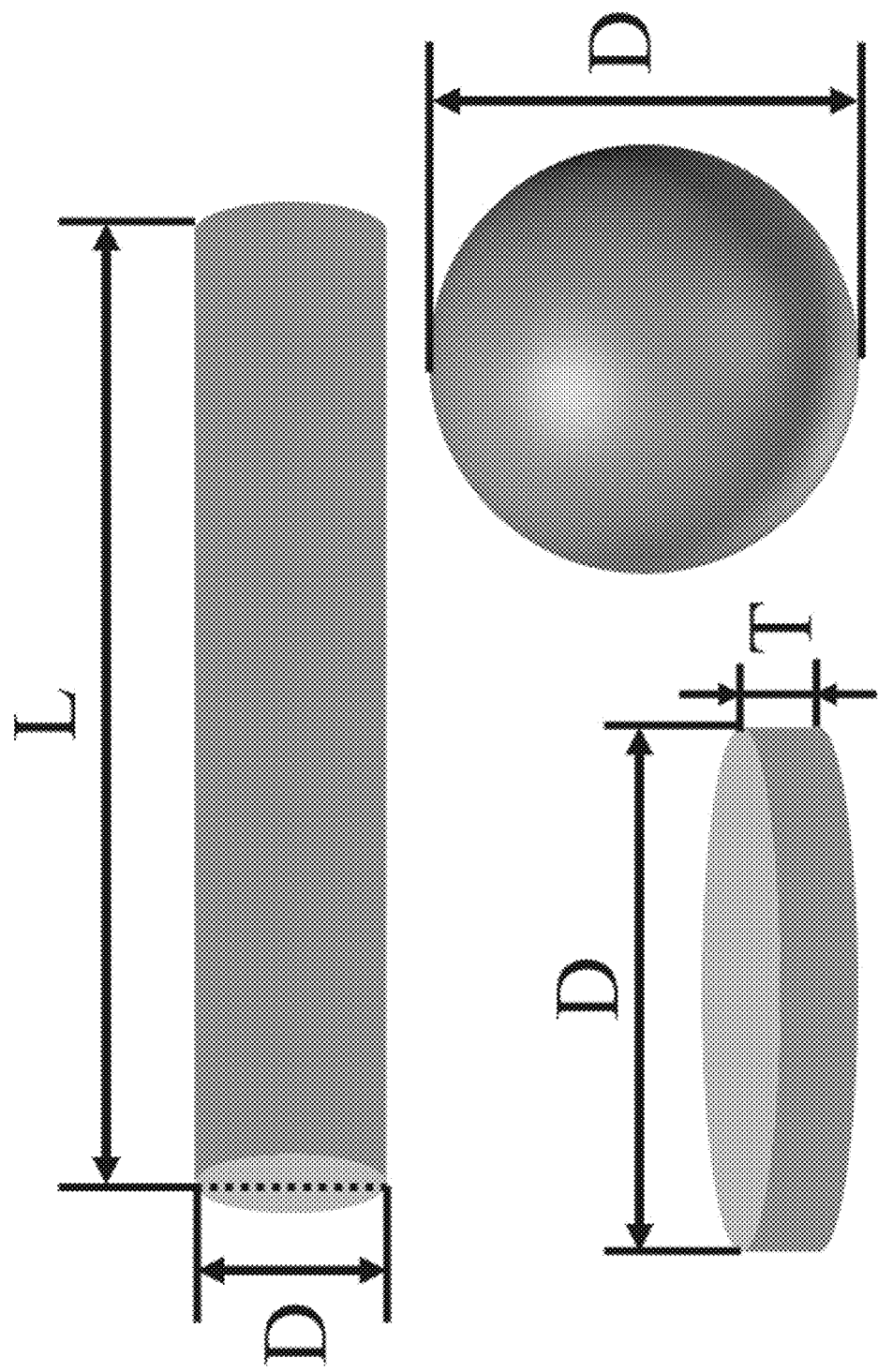
FIG. 2B show different examples of the shapes of the ceramic fillers used in the fabrication of the binder medium of FIG. 1A.

Alternatively, the ceramic fillers may include one or more of the following materials. This may include silicon nitride, silicon carbide, silica, zirconia, alumina, titania, silver, chlorhexidine, ytterbium trifluoride, calcium fluoride, calcium phosphate, calcium silicate, dicalcium phosphate anhydrous, and/or hydroxyapatite, and has a shape of a sphere, a whisker, a platelet, a tube, a fiber and/or a rod. By mixing different types and ratios of inorganic fillers with the polymeric materials, preferably in a range of volume % of 0.1-10% of fillers in different portions or layers of the binder medium, and different shapes and/or sizes of inorganic fillers, preferably having a dimension in a range from 5 nm to 200 μm (such as a diameter (D) of the tube/rod/particulate/platelet, a length (L) or the tube/rod and the thickness (T) of the platelet) referring to FIG. 2B, the physical properties of different portions of the medium may be modified to different first and/or second physical properties.

Figure 3A:
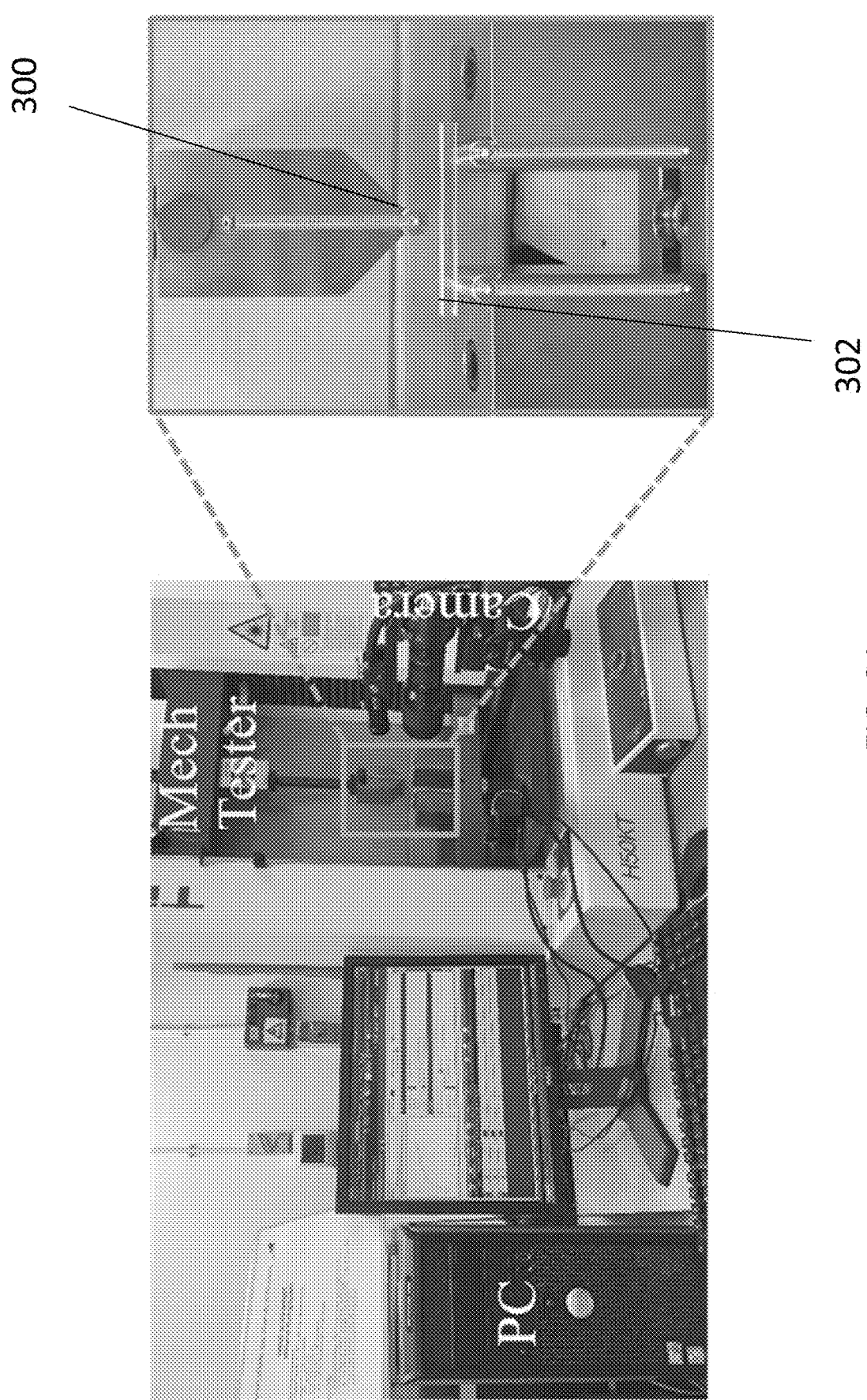
FIG. 3A is an image showing an example set-up of three-point bending test on tri-layer beam structures used for evaluating mechanical properties of a multi-layered assembly in accordance with an embodiment of the present invention.

The inventors have performed experiments to evaluate the strength of tri-layer beam structures samples with the multi-layered adhesive binding two layers, using a three-Point bending test. With reference to FIG. 3A, the tests were conducted with a mechanical tester, in which a monotonic mechanical load was applied by a roller 300 with a diameter of 10 mm to the upper surface of the glass 302 with a displacement rate of 0.25 mm/second.

Figure 3B:
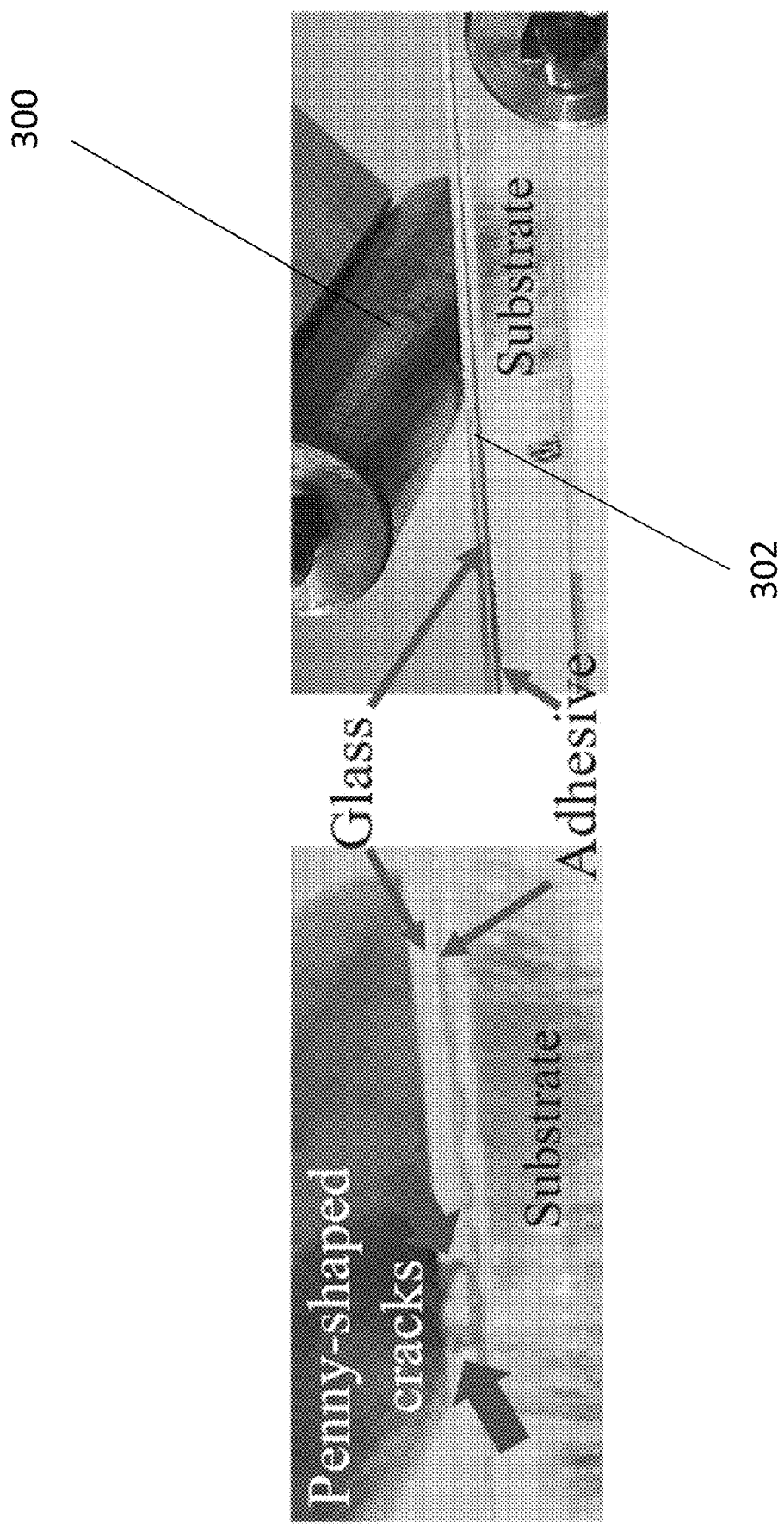
FIG. 3B is an enlarged view of the roller on the top surface of glass layer and the initiation of penny-shaped cracks in the glass in the sample used in the experiment of FIG. 3A.
Figure 3C:
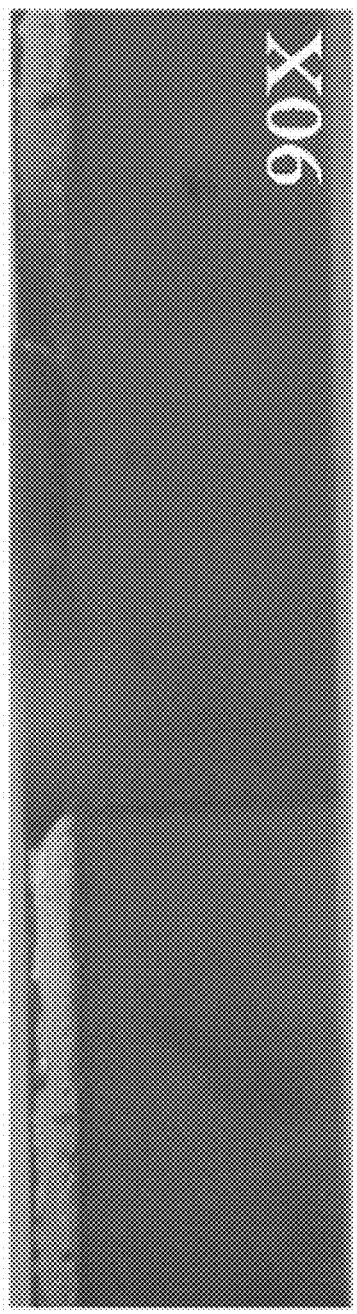
FIGS. 3C and 3D are respectively side view and top view of a penny shaped crack generated on the test sample in the three-point bending test experiment in FIG. 3A.
Figure 3D:
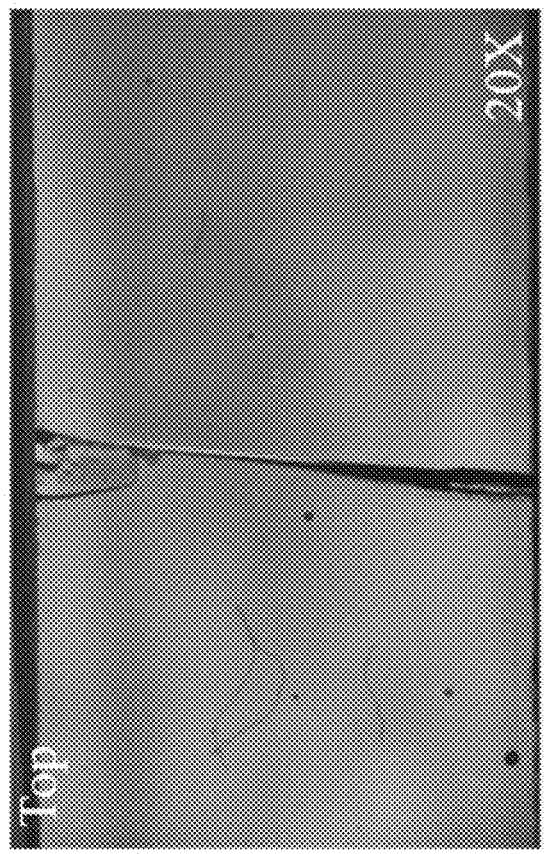

Referring to FIGS. 3B to 3D, penny-shaped cracks appeared at the subsurface of the top glass layer 302. The crack pop-in load was recorded to represent the damage resistance of the structure.

Figure 4:
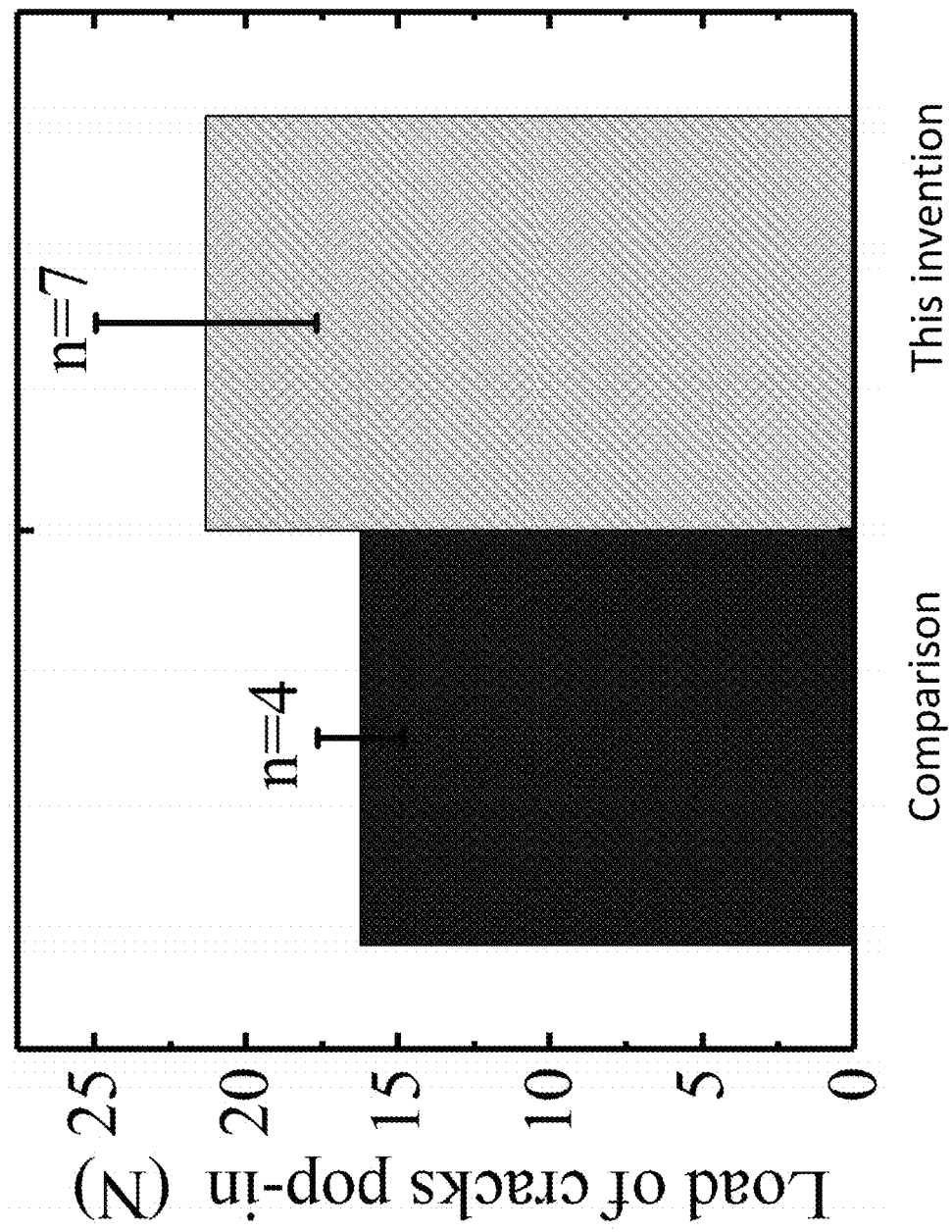
FIG. 4 is a plot showing a comparison of the cracks pop-in load of tri-layer beam structures with single-layered adhesive and graded adhesive.

With reference to FIG. 4, there is shown results of cracks pop-in load of tri-layer beam structures with single layer LOCA and graded adhesive layer LOCA. Penny-shaped cracks initiated in the center of the glass layer in tri-layer beam structures suffered three-point bending load. Crack pop-in load were determined at the moment when the first crack appeared. The errors were determined from the standard deviations of the experimental data. The results show that the cracks pop-in load of tri-layer beam structures increased by almost 30% from 16.32 N to 21.15 N when graded adhesive 106 were adopted.

In an embodiment of the present invention, a finite element (FE) model had been constructed to explain the strength-enhancement mechanism by adopting bi-layer adhesive 106.

For evaluating or optimizing the binder medium which may include different parameters for different applications, a system for simulating mechanical behaviours of an electronic device may be used. For example, the system may comprise: a component generation module arranged to create a plurality of models of the electronic device and a plurality of rigid bodies; and a simulation module arranged to simulate mechanical behaviours of the electronic device associated with the plurality of models being generated; wherein the plurality of rigid bodies defines a plurality of rigid support structures that apply external mechanical loads to the electronic device at different positions.

Figure 5A:
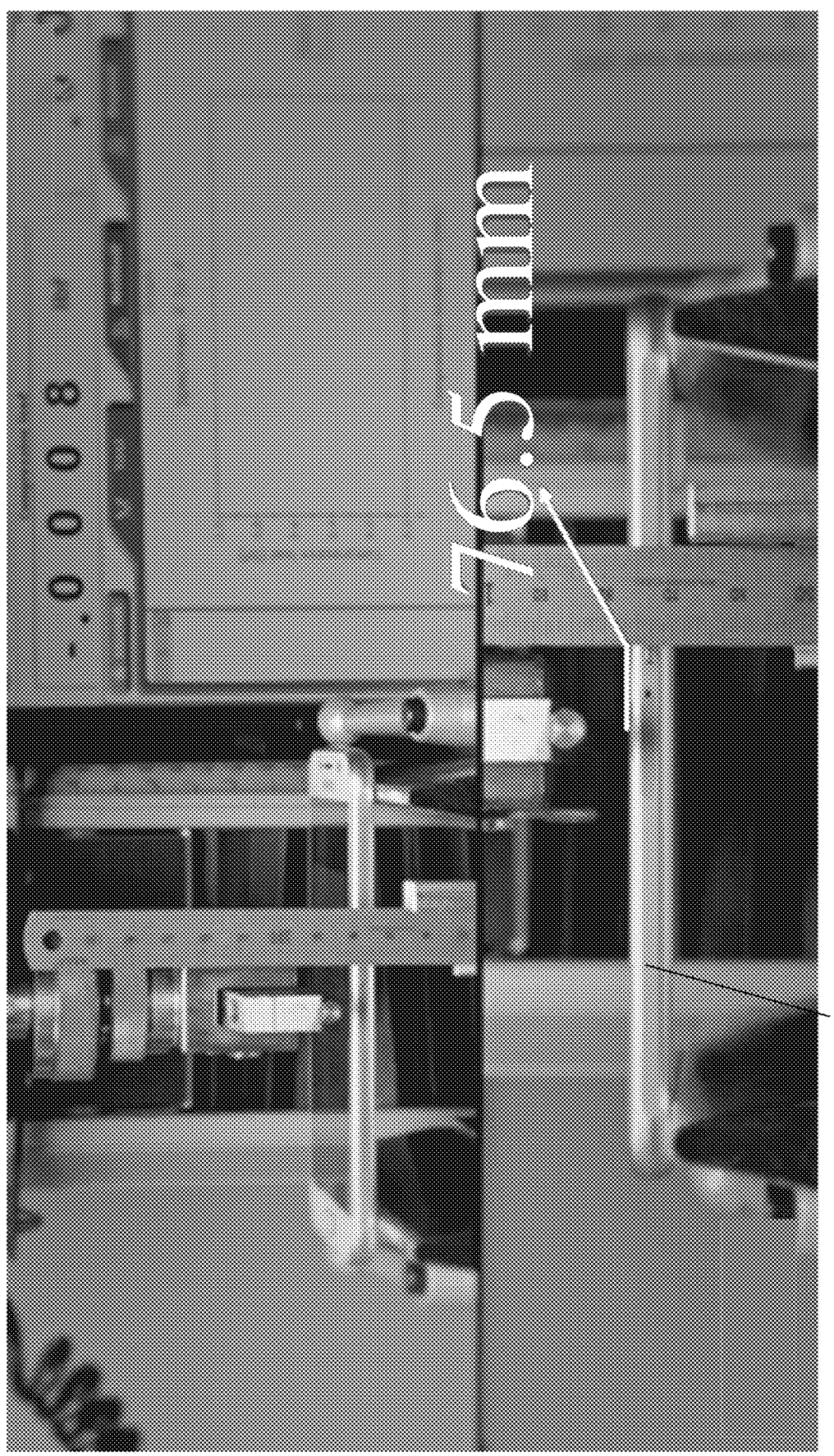
FIGS. 5A and 5B are images showing a three-point bending test of a mobile phone device and the corresponding quarter FE model before after the test and at end of the loading stage when the maximum load and deflection are obtained.
Figure 5B:
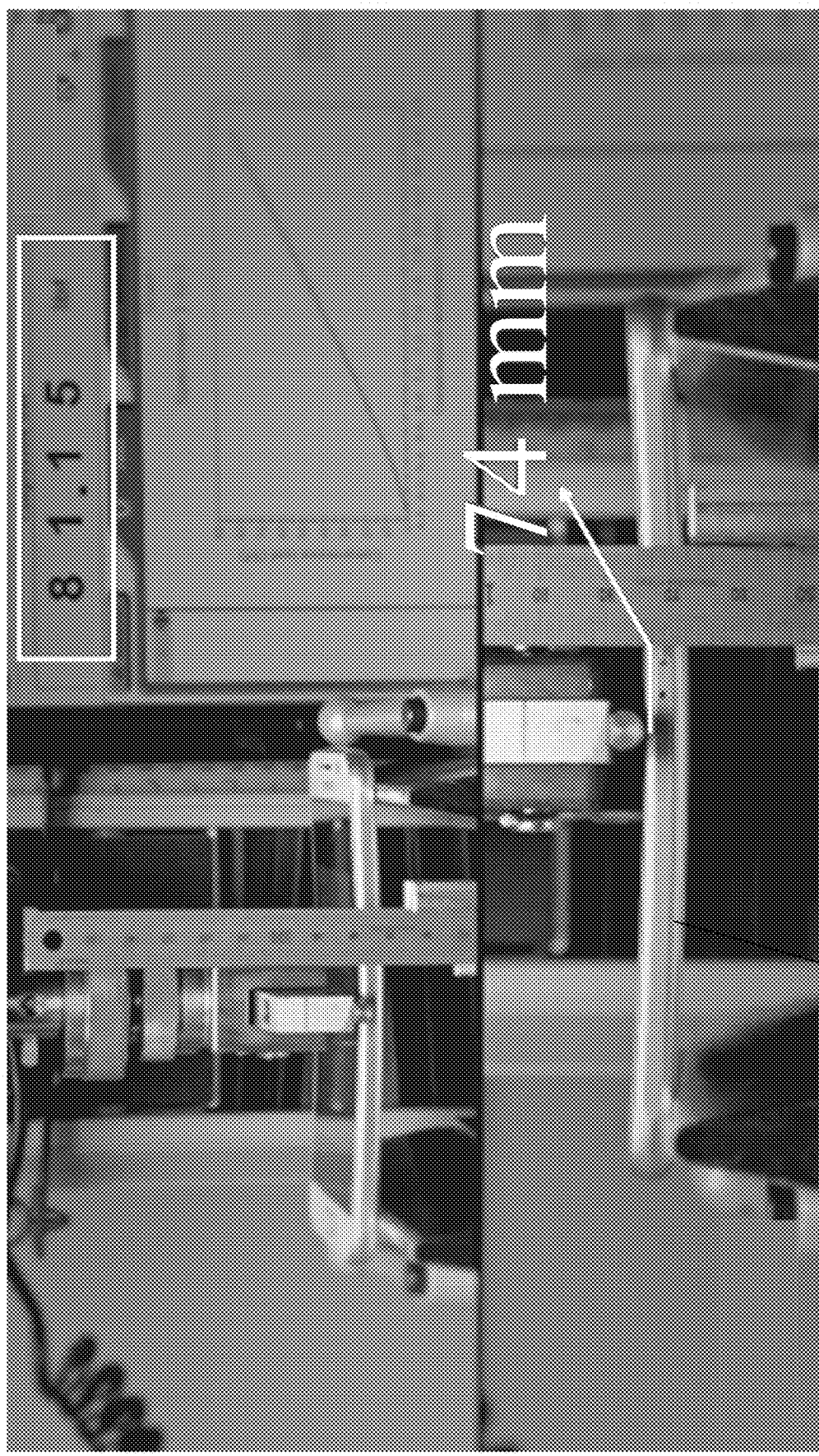

FIGS. 5A and 5B illustrate a set-up of a three-point phone bending test. In this test, the deflection of the centre point along the length direction of the smartphone reaches the maximum value (2.5 mm) when applied load is 81.15 lbf (~360 N).

The dimensions of the smartphone 400 in this test are 143.4×70.5×6.8 mm$^3$. Along the thickness direction the smartphone 400 can be simplified as three layers. The top layer is the 0.4 mm cover glass layer which is made up of Corning Gorilla Glass, the middle layer is the 0.2 mm LOCA layer which assembles the cover glass and the display panel, and rest components of the smartphone are combined to a 6.2 mm single phone body layer.

Figures 6A, 6B:
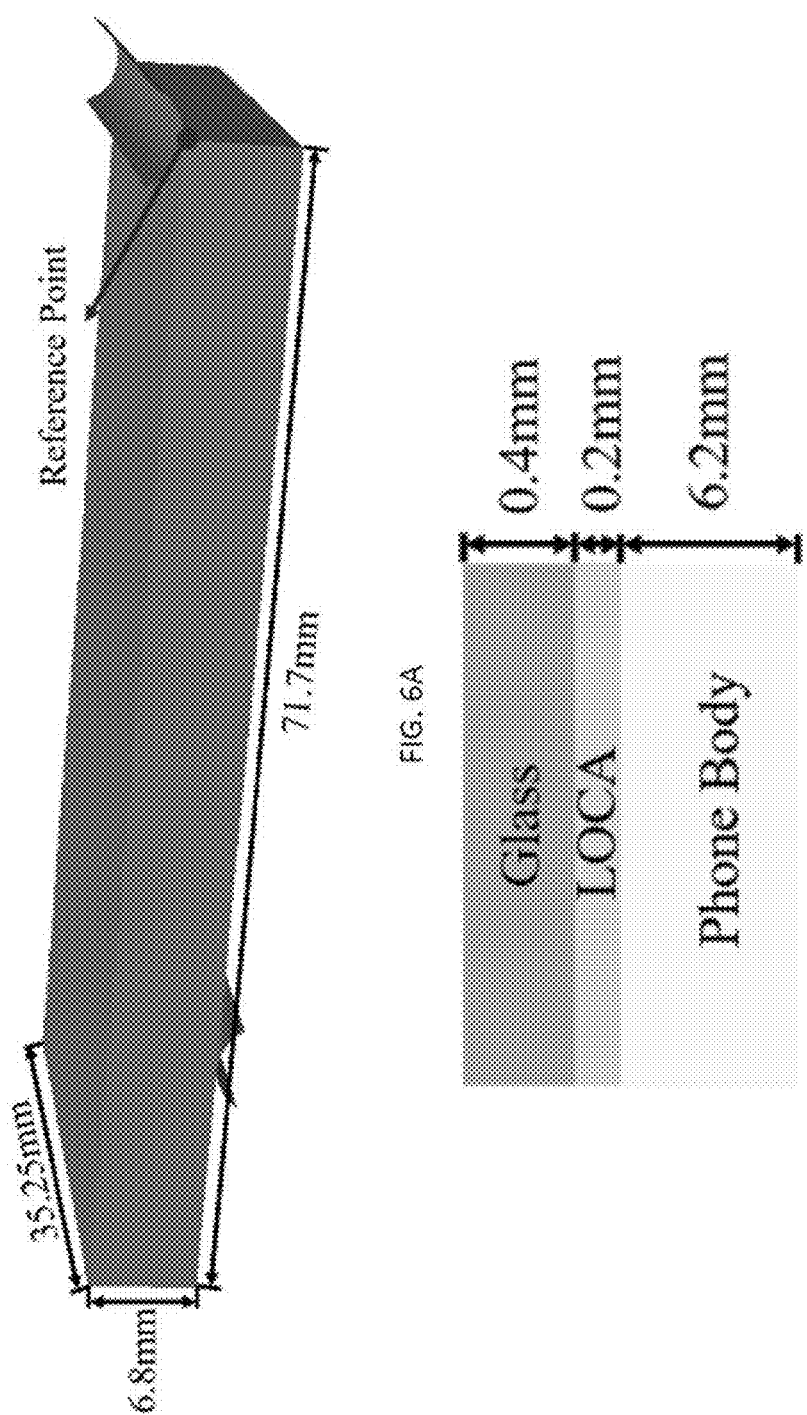
FIG. 6A is a schematic diagram of an FE model of quarter three-point bending test.
FIG. 6B is a cross-sectional diagram of the smartphone FE model of FIG. 6A.

With reference to FIGS. 6A and 6B, there is shown a quarter three-point bending test FE model and the schematic of cross section of the smartphone FE model. The FE model was designed based on the symmetry of three-point bending test, and is established using an Abaqus FEA software package.

In order to reproduce the results of test so that stress state and distribution of the smartphone especially the cover glass layer during the test can be checked. Punch and supports of the three-point bending test are modelled with analytical rigid body, which the applied load can be obtained through the reactive force of the reference point in the punch.

To simulate the three-point test and to evaluate the performance of the binder medium, the simulation experiment may be design to include multiple rigid bodies that applies a supportive forces to bend a deformable or relatively flexible body to determine strain or stress accumulated in the flexible body that represents a electronic device with a display assembly. For example, the components involve in the three-point test simulation may include a first rigid body and a second rigid body representing two supporting rollers arranged to support the electronic device in the three-point bending test; and a third rigid body to arranged to apply a loading punch to the electronic device in the three-point bending test, and the model of the electronic device may be represented by a deformable part in the three-point bending test.

Figure 7:
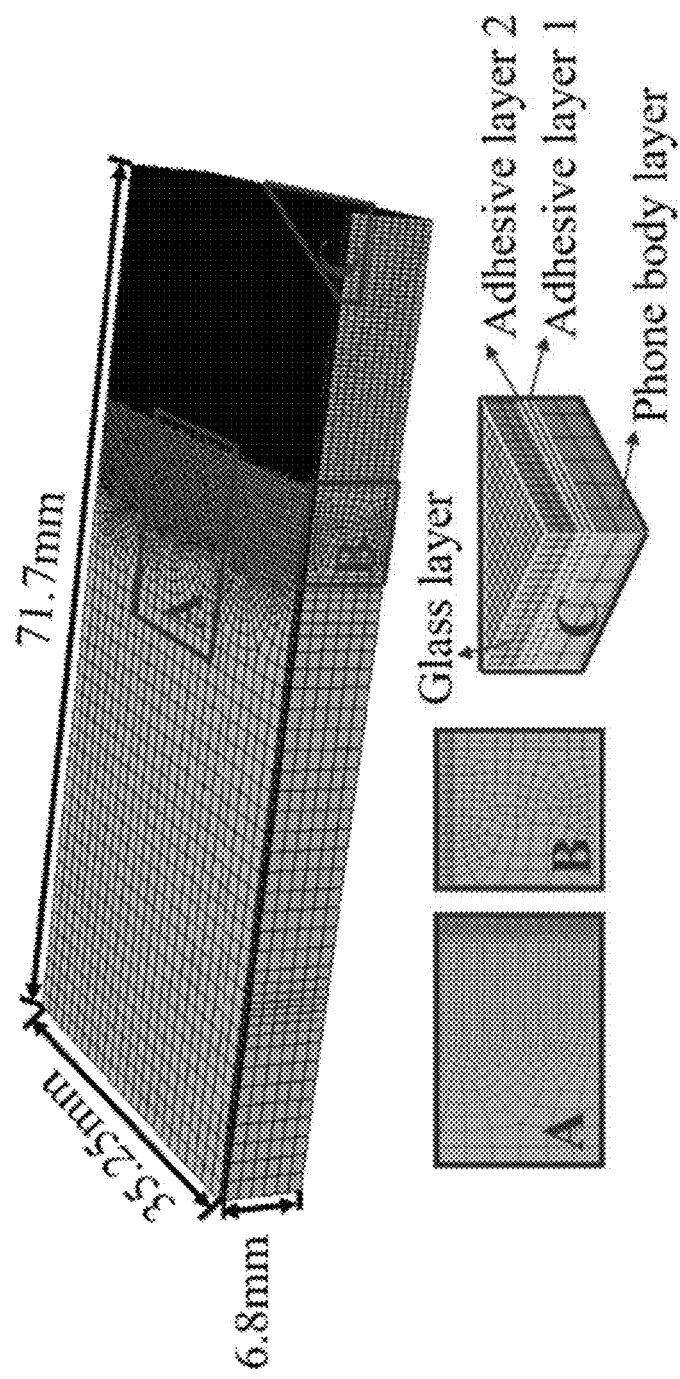
FIG. 7 is a schematic diagram showing a refined mesh FE model of a smartphone subjected to three-point bending test.

With reference to FIG. 7, there is shown a refined mesh FE model of the smartphone. In this refined model, the electronic device comprises a glass layer, an adhesive (LOCA) layer and a device body layer, a 20-node quadratic brick element C3D20R was used in the regions near the axisymmetric axis of the cover glass layer and the LOCA layer, and the mesh is dense in these regions in an effort to capture the high stress concentration. An 8-node linear brick element C3D8R was used in other regions which are less affected by stress concentration in order to increase the calculation efficiency.

In addition, the adhesive layer further comprises a plurality of sub-layers each includes individual mechanical properties. For example, the LOCA layer may be modeled as 2 sublayers: namely Adhesive layer 1 and Adhesive layer 2, so that the Young's modulus of each sublayer can be set individually. The total element number of the smartphone FE model is 372,344, consisting of 112,964 C3D8R elements and 259,380 C3D20R elements. Due to the large mount of elements, finite element analysis (FEA) calculation works are performed using a High Performance Computer Cluster.

Optionally, to further enhance the computation speed of the simulation experiment, the size of brick elements increases gradually from the centre of the electronic device where stresses are concentrated to the two ends of the electronic device along the longitudinal direction of the electronic device. In addition, the brick elements are provided with reduced integration In the simulation, Young's modulus and Poisson's ratio of cover glass layer which were 65.8 GPa and 0.22 respectively.

Shore hardness test may be used to assess the elastic mechanical behaviour of elastomeric and elastomeric-like materials, and its hardness value can be directly related to Young's modulus E using the following equation:

$$\log E = 0.0235S - 0.6403 \quad (1a)$$

$$S = \begin{cases} \text{Shore } A & 20A < S < 80A \\ \text{Shore } D + 50 & 80A < S < 85D \end{cases} \quad (1b)$$

where S is shore hardness value while Shore A and Shore D indicate type A and type D shore hardness test respectively. Based on this equation and shore hardness value range of LOCA, Young's modulus of LOCA may vary from 0.61 MPa to 1.23 MPa. In this simulation, Young's modulus of LOCA layer including adhesive layer 1 and adhesive layer 2 were both assumed to be 1 MPa.

To simplify the simulation model, the substrate or the phone body layer was considers as a smartphone excluding cover glass and LOCA parts, and consisting of only the remaining parts such as a metal frame, a battery and other electronic components. However, due to its complexity of composition, Young's modulus of the phone body layer needs to be determined with the aid of FEA calibrations results.

Figure 8:
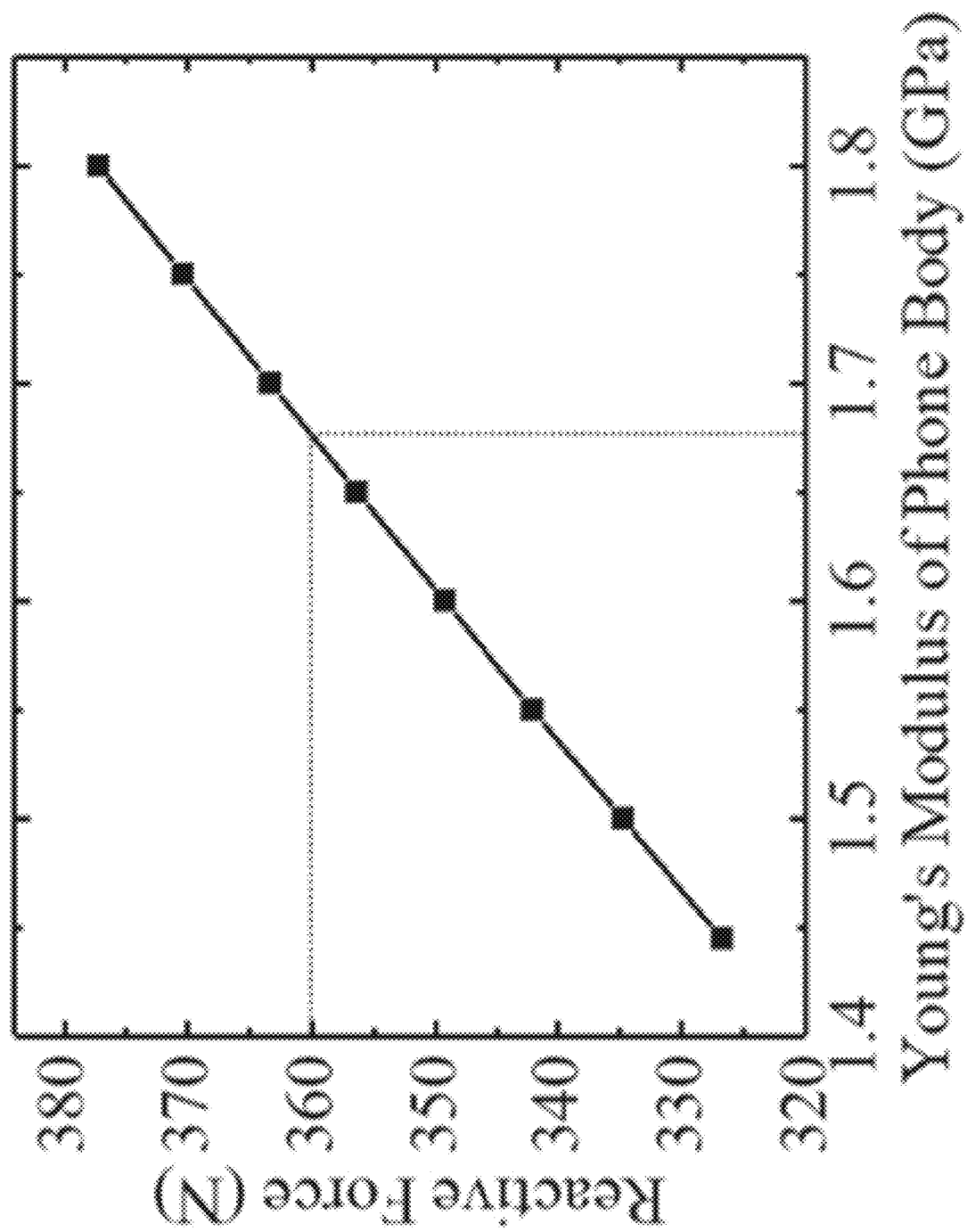
FIG. 8 is a plot showing reactive forces versus Young's modulus of the phone body layer under 2.5 mm displacements loading.

FEA calibrations may be performed under the 2.5 mm displacements loading condition, which is exactly same to the three-point phone bending test using a real smartphone as discussed above. The reactive forces of the reference point in FIG. 6A may be obtained by changing the Young's modulus of the phone body layer. Referring to FIG. 8, the reactive force equals 360 N, which is close to the applied load (81.15 lbf) in the three-point phone bending test when the Young's modulus is around 1.68 GPa. Thus, 1.68 GPa is adopted as the Young's modulus of the phone body layer for further simulation. FIG. 8 demonstrated that the FE model illustrated by FIGS. 6A, 6B and 7 was able to replicate the mechanical response of the smartphone device shown in FIGS. 5A and 5B.

Figure 9:
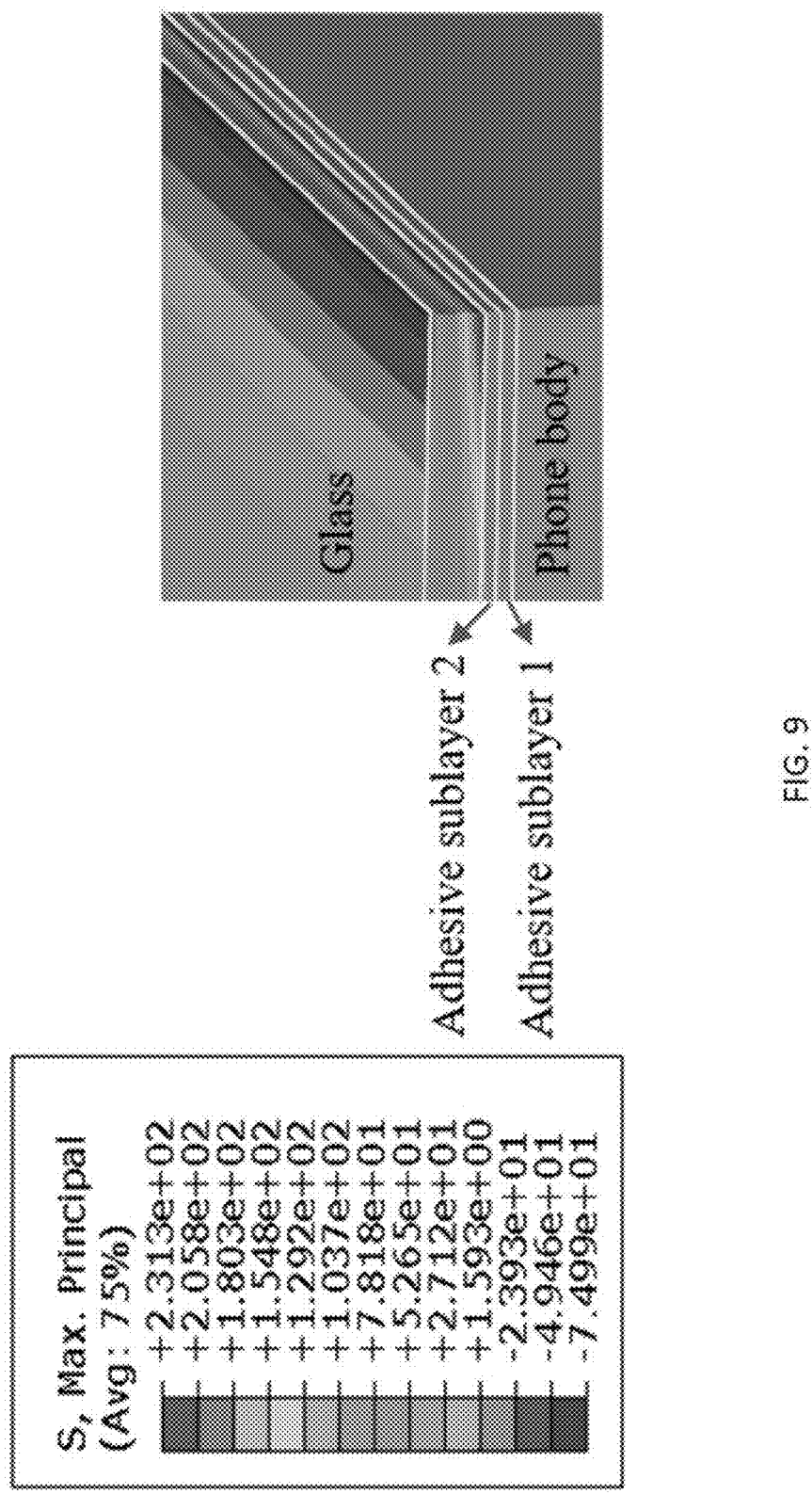
FIG. 9 is a colour plot showing displacement contour and maximum principal stress distribution of the mobile phone model under three-point bending test.

With reference to FIG. 9, the displacements and stress distribution of a quarter of the model of the three-point phone bending test are presented. The maximum principal stress is 231.3 MPa, appearing at the middle point of the sub-surface of glass layer as predicted and demonstrated by the experimental phenomena shown in FIGS. 3B, 3C and 3D.

Mechanical behaviour of the new adhesive consisting of two sublayers with different Young's modulus were designed and simulated. In the experiments, the Young's modulus of both adhesive layer 1 and adhesive layer 2 were limited under 128 MPa for simplicity. The designs are divided into three groups, and each group contains multiple combinations of sublayers with different Young's modulus, i.e. the Young's modulus of adhesive layer 1 remains unchanged as 1 MPa while that of adhesive layer 2 increase from 1 MPa in Group 1, Young's modulus of adhesive layer 1 remains unchanged as 2 MPa while that of adhesive layer 2 increase from 4 MPa in Group 2, and Young's modulus of adhesive layer 2 remains unchanged as 128 MPa while that of adhesive layer 1 increase from 1 MPa in Group 3.

FEA simulation was performed to evaluate the efficiency of each combination in reducing the maximum principal stress of the cover glass layer under the three-point bending condition.

Preferably, the system may also be used for simulating mechanical behaviours of the binder medium. For example, the system may further comprise an optimization module arrange to simulate mechanical behaviours of the medium based on different parameters in the first layer of material and the second layer of material. The parameters includes at least one geometric property and at least one mechanical property.

By using the simulation model as discussed above, the system may determine stresses, strains and deformation of the electronic device under external mechanical loads, and may output or export the stresses, strains and deformation of the electronic device under external mechanical loads, for user evaluation purposes. Such information may be useful for further optimizing the different layers in the binder medium when designing the LOCA for different electronic devices.

Figures 10A, 10B:
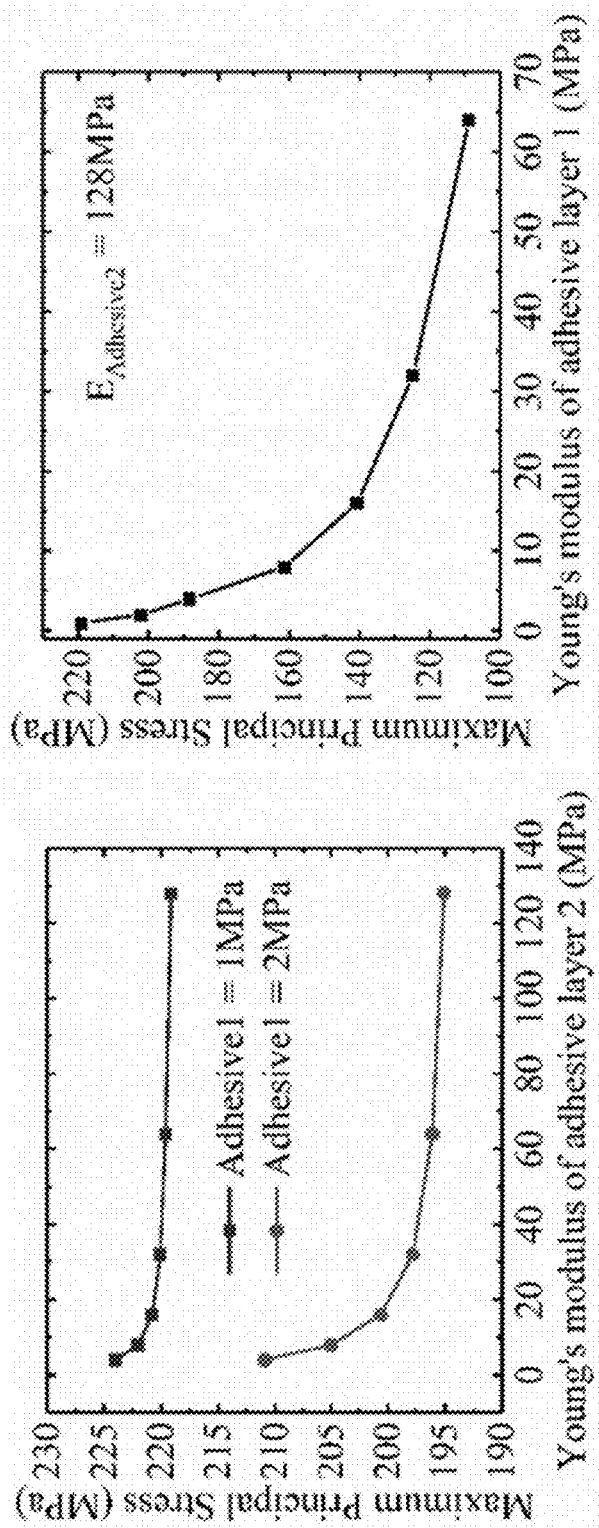
FIGS. 10A and 10B are plots showing maximum principal stresses in the subsurface region of the cover glass layer in the smartphone FE models with different adhesive layer 1 and adhesive layer 2 combinations.

With reference to FIG. 10A, there is shown results of maximum principal stresses in the subsurface region of the cover glass layer reduce with the increasing of Young's modulus of adhesive layer 2 in Group 1 and Group 2. It is also observable that the reduction of maximum principal stresses in the subsurface region of the cover glass layer is greater when Young's modulus of adhesive layer 1 is 2 MPa. When Young's modulus of adhesive layer 2 reaches 128 MPa, the maximum principal stress reduces 5.27% (from 231.3 MPa to 219.1 MPa) and 15.65% (from 231.3 MPa to 195.1 MPa) in Group 1 and Group 2 respectively.

With reference to FIG. 10B, there is shown the results of maximum principal stresses in the subsurface region of the cover glass layer reduce with the increasing of Young's modus of adhesive layer 1 in Group 3, and the maximum principal stress reduces 52.92% (from 231.3 MPa to 108.9 MPa) in Group 3. It is also observable that the bi-layer adhesives, which the Young's modulus of adhesive 2 is greater than that of adhesive layer 1, can effectively reduce the maximum principal stresses in the subsurface region of the cover glass layer, thus increasing the damage resistance ability of smartphones.

Advantageously, by selecting the Young's modulus of adhesive layer 1 as 64 MPa and Young's modulus of adhesive layer 2 as 128 MPa, the maximum principal stress in the subsurface region of the cover glass layer decreases from 231.3 MPa to 108.9 MPa.

These embodiments may be advantageous in that strength of electronic device with a display panel may be enhanced by using graded adhesive that include multiple layers of LOCA mixed with ceramic fillers.

Advantageously, by changing the Young's modulus of graded adhesive layer, the maximum principal stress of glass layer may be reduced, thereby increasing the maximum cracks pop-in load of the glass layer.

In addition, a refined quarter FE smartphone model has been established to verify the effect of graded adhesive in smartphones, and the model may be used to fine tune the properties of different layers in the adhesive medium. In the simulation, stress distribution status of each layer in smartphones under the three-point bending load conditions may be obtained. Then methods of designing graded adhesive which can enhance the damage resistant ability of cover glasses were put forward with the aid of both experimental and FE simulation results.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A medium for binding components in an assembly of an electronic device, comprising:
    a first layer of material defining a first portion having mechanical properties and arranged to connect with a first component of the assembly; and
    a second layer of material, being disposed directly adjacent to the first layer of material, defining a second portion having a set of mechanical properties with one or more values different from those in the first portion, and the second layer of material is arranged to connect with a second component of the assembly;
    wherein both the first layer of material and the second layer of material comprises a polymeric composite containing a polymer matrix, and at least one of the first layer of material and the second layer of material further comprises ceramic fillers, and the first layer of material and the second layer of material include different contents of ceramic fillers;
    wherein a combination of the first layer of material and the second layer of material is arranged to minimize stress established in the first component when the first component combines with the second component;
    wherein each of the first layer of material and the second layer of material includes 0.1-10% of volume percentage of ceramic fillers.

2. The medium for binding components in an assembly of an electronic device according to claim 1, wherein the medium is arranged to act as a stress-dispersing layer between the first component and the second component.

3. The medium for binding components in an assembly of an electronic device according to claim 1, wherein the medium is arranged to inhibit and deviate the growth of cracks in the first component and in the medium.

4. The medium for binding components in an assembly of an electronic device according to claim 1, wherein the value of an individual mechanical property of the mechanical properties of the first portion is different from the value of that same mechanical property of the second portion.

5. The medium for binding components in an assembly of an electronic device according to claim 4, wherein, due to the different values of the individual mechanical property in the first layer of material and the second layer of material, there is a gradual change of the individual mechanical property along the thickness of the medium for binding components.

6. The medium for binding components in an assembly of an electronic device according to claim 1, wherein the mechanical property is selected from at least one of Young's modules, hardness, and mechanical strength.

7. The medium for binding components in an assembly of an electronic device according to claim 1, wherein the polymeric composite includes a liquid optical clear adhesive material.

8. The medium for binding components in an assembly of an electronic device according to claim 1, wherein the ceramic fillers include at least one inorganic compound.

9. The medium for binding components in an assembly of an electronic device according to claim 8, wherein the inorganic compound includes silica and/or zirconia.

10. The medium for binding components in an assembly of an electronic device according to claim 1, wherein the first layer of material and the second layer of material are optically transparent.

11. The medium for binding components in an assembly of an electronic device according to claim 1, wherein the first layer of material and the second layer of material have the same thickness.

12. The medium for binding components in an assembly of an electronic device according to claim 11, wherein a thickness of the combination of the first and the second layers of material is 0.2 mm.

13. The medium for binding components in an assembly of an electronic device according to claim 1, wherein the assembly is a display assembly.

14. The medium for binding components in an assembly of an electronic device according to claim 1, wherein the electronic device includes a computing device and/or a display device.

15. The medium for binding components in an assembly of an electronic device according to claim 1, wherein the first component and the second component include at least two of a transparent cover, a touch panel and a display panel.

16. The medium for binding components in an assembly of an electronic device according to claim 1, wherein the first component includes a piece of glass.

17. A display assembly of an electronic device, comprising a first component and a second component, and a medium for binding components in an assembly in accordance with claim 1.

* * * * *